(12) United States Patent
Perelli et al.

(10) Patent No.: US 6,497,423 B1
(45) Date of Patent: Dec. 24, 2002

(54) MOBILE MAINTENANCE CART HAVING A STORAGE COMPARTMENT, A BAG RETENTION SYSTEM, AND A FORWARD FACING RECESS FOR SUPPORTING A CONTAINER

(75) Inventors: Thomas Perelli, Winchester, VA (US); David Hawks, Stephens City, VA (US)

(73) Assignee: Rubbermaid Commercial Products LLC, Winchester, VA (US)

( * ) Notice: Subject to any disclaimer, the term of this patent is extended or adjusted under 35 U.S.C. 154(b) by 0 days.

(21) Appl. No.: 09/159,183

(22) Filed: Sep. 23, 1998

(51) Int. Cl.$^7$ ................................................. B62B 3/00
(52) U.S. Cl. ............................. 280/47.34; 280/47.35; 280/79.2
(58) Field of Search ................... 280/47.19, 47.35, 280/47.34, 33.992, 33.996, 79.2, 651, 659; D34/11, 12, 14, 21; 224/400, 409, 411, 282; 220/810

(56) References Cited

U.S. PATENT DOCUMENTS

| | | | |
|---|---|---|---|
| 4,350,366 A | 9/1982 | Helms | 280/655 |
| D273,242 S | 3/1984 | Maza et al. | D34/21 |
| 4,685,854 A * | 8/1987 | Bulle | 414/452 |
| 4,809,897 A * | 3/1989 | Wright, Jr. | 224/282 |
| D302,064 S | 7/1989 | Delmerico | D34/20 |
| 4,869,518 A | 9/1989 | Breveglierij et al. | 280/47.35 |
| D330,103 S | 10/1992 | Andrews, Jr. | D34/20 |
| 5,340,135 A * | 8/1994 | Wonberly | 280/47.19 |
| D391,032 S | 2/1998 | Delmerico | D34/21 |

OTHER PUBLICATIONS

Catalog page, Carts; Jani–Jack Limited, Coat Road, Martock, Somerset TA12 6EY, England. Publication date Oct., 1995.

Catalog page, Carts; Henkel KGaA/R GV, Verkauf RT/Floordress, Postfach 1100, 4000 Dusseldorf, Germany. Published at least as early as Jun., 1998.

Catalog page, Carts; Numatic International Limited, Chard, Somerset, TA20 2LW, England. Publication date 1994.

Catalog page, Carts; Numatic International Limited, Chard, Somerset, TA20 2LW, England. Publication date 1994.

Catalog page, Carts; Tecno Trolley System, address unknown. Published at least as early as Jun., 1998.

Page 22, Cart; Company name and address unknown. Published at least as early as Jun., 1998.

Catalog page, Carts; Falpi s.r.l., Via Diagonale, 120, 13064 Ponzone Trivero (BI) Italy. Published at least as early as Jun., 1998.

Page 4, Carts; Geerpres, P. O. Box 548, Muskegon, Michigan 49443. Published at least as early as Jun., 1998.

(List continued on next page.)

Primary Examiner—Paul N. Dickson
Assistant Examiner—L. Lum
(74) Attorney, Agent, or Firm—Foley & Lardner

(57) ABSTRACT

A mobile cart (10) is disclosed comprising a wheeled platform (12), and a plurality of uprights (18, 20, 22) extending upward therefrom to support a middle shelf (24) at an intermediate level, and an upper shelf (26) at a top level. The intermediate shelf is adapted to provide an arcuate forward surface (98) for receiving and cradling a refuse container positioned upon the wheeled platform (12) to prevent tipping of the container when the cart is turned. A handle (28) affixes to the upper shelf (26) and a bag (214) is suspended from the handle. A compartment comprising a base (30) and a cover (32) is pivotally attached to the handle to move in unison between a lowered position wherein the compartment covers the upper open end of the bag (214), and an upper position wherein the bag top is exposed. The cover and base define an internal storage compartment (156) for isolating objects from surrounding individuals as well as isolating the contents of the bag from contact with the surrounding environment.

20 Claims, 13 Drawing Sheets

OTHER PUBLICATIONS

Pages 20 and 21, Carts; Continental Manufacturing Co., 123 Byassee Dr., Hazelwood, Missouri 63042. Published at least as early as Jun., 1998.

Catalog page, Carts; Nilfisk, address unknown. Published at least as early as Jun., 1998.

Page 26, Carts; Filmop s.n.c., 35010 Villa Del Conte (Padova), Italy. Published at least as early as Jun., 1998.

Page 9, Carts; Jani–Jack Limited, Coat Road, Martock, Somerset, England TA12 6EY. Published at least as early as Jun., 1998.

Catalog page, Carts; Jani–Jack Limited, Coat Road, Martock, Somerset, England TA12 6EY. Published at least as early as Jun., 1998.

Catalog page, Carts; Jani–Jack Limited, Coat Road, Martock, Somerset, England TA12 6EY. Published at least as early as Jun., 1998.

Page 4, Carts; Vermop Salmon GmbH, D–6980 Wertheim, Germany. Published at least as early as Jun., 1998.

* cited by examiner

MOBILE MAINTENANCE CART HAVING A STORAGE COMPARTMENT, A BAG RETENTION SYSTEM, AND A FORWARD FACING RECESS FOR SUPPORTING A CONTAINER

BACKGROUND OF THE INVENTION

1. Field of the Invention

The subject invention relates generally to mobile maintenance carts and, in particular, to such carts specifically adapted to transport implements and waste containers utilized in the performance of sanitary maintenance duties.

2. The Prior Art

Mobile carts for use in the performance of sanitary maintenance duties are well known and have found wide application in a range of commercial maintenance functions. Typically, such carts comprise a wheeled elongate platform having a top surface dimensioned to support and transport a cylindrical or square refuse container or mop bucket. Projecting upward from the platform are three uprights which support a tray at an upper end. An intermediary tray is disposed beneath the upper tray, likewise supported by the uprights. Extending rearward from the cart at the upper end is a rectangular handle frame from which a refuse bag may be suspended.

U.S. Pat. No. 273,242, incorporated herein by reference, discloses a maintenance cart of the type described above. As described above, a waste receptacle or mop bucket may be positioned on the forward portion of the wheeled platform and transported thereby to locations requiring sanitary maintenance. The upper and lower shelves are typically used to store cleaning chemicals and paper products thereon, thereby rendering such material accessible to the user from two sides of the cart with regard to the lower shelf, and four sides of the upper shelf. The handle, in addition to providing a handgrip whereby the user may propel the cart, also includes attachment fasteners from which a refuse bag may be attached and suspended therefrom. The refuse bag is thus held open at the top so as to enable the user to conveniently fill the bag with assorted refuse material. The cart further provides various hooks and fasteners along the sides of the upper and lower shelves by which implements such as brooms, dustmops or brushes may be attached to the cart and transported thereby from work site to work site.

The cart described above has found widespread use in a variety of public settings such as airports, hospitals, schools and businesses. The carts have been found to be versatile in meeting the various needs of the sanitary maintenance field. However, because of the ubiquitous public applications in which such carts are used, it has been found that commercially available carts of the type described above have certain deficiencies attendant their use which prevent them from satisfying all of the needs of the user, particularly health and security needs.

For example, the cleaning chemicals used in various applications are frequently harmful if ingested or improperly handled. Storing such material on open and accessible shelves of the cart creates a risk that children or the elderly passing the cart may access the chemicals and be harmed thereby.

Secondly, some materials gathered by sanitary maintenance workers and placed in the rearward bag, particularly in hospital or clinical environments, are contagious or otherwise require isolation from the surrounding environment for health reasons. Available carts, with their open top rearward bags, do not provide the level of isolation necessary to avoid the risk of air-born contamination. Also, it is common for plastic bags to be used as liners inside the semi-rigid vinyl bag suspended from the handle. However, available carts do not have convenient, reliable means for keeping the inner bag from collapsing inside the outer liner. A collapsed inner liner bag is inconvenient to remove and could present a hazard if the contents thereof are hazardous.

Thirdly, there is a tipping risk associated with transporting full waste containers on the forward end of available carts. The high center of gravity of a full container may make it prone to tippage under certain conditions, particularly as a user negotiates turns. If filled with harmful or hazardous material, tippage of the waste container can result in an undesirable exposure of the surrounding environment to such material.

Finally, there is an as yet unmet need for a secure storage compartment in maintenance carts wherein security items such as keys may be stored. Such a compartment must be convenient and accessible to the user of the cart yet be inaccessible and hidden to others passing the cart.

SUMMARY OF THE INVENTION

The aforementioned deficiencies summarized above with respect to commercially available maintenance carts are eliminated by the subject invention. A cart is provided having an upper and an intermediary shelf. A secure, lockable enclosure assembly is provided for residence between the space between the shelves, and defines upon the intermediary shelf a secure interior storage chamber for chemicals, cleaning sprays, and other potentially hazardous material commonly used in cleaning activity. A cover member is pivotally attached to a forward side of the handle and pivots rearward to enclose the top opening of the refuse bag suspended from the handle. The contents of the bag are thus isolated and the risk of unwanted exposure with the environment is eliminated.

A forward side of the intermediary tray is formed having an arcuate indentation positioned above the support surface of the wheeled platform. The arcuate indentation is disposed and shaped to receive therein an upper portion of a waste container situated upon the wheeled platform and supports and stabilizes the container against tipping forces.

In addition, a bag clamping system is incorporated into the cart handle and comprises forward and rearward clamping bars which operate to capture and pin upper portions of a refuse bag liner against an internal handle ledge, whereby keeping the liner bag in an open, uncollapsed, and safe orientation for convenient and safe removal.

Finally, the cover member described previously comprises a compartment base and a cover panel which define a storage compartment. The storage compartment is readily accessible to a user stationed behind the cart yet is hidden from view and secure from unauthorized access. The storage compartment provides a place for the storage of keys, or personal items of the user of the cart.

Accordingly, it is an objective to achieve a sanitary maintenance cart having enhanced security.

A further objective is to provide a sanitary maintenance cart having enhanced stability and means for deterring a waste container thereon from tipping.

Still a further objective is to provide a sanitary maintenance cart having lockable means for storing hazardous material.

Another objective is to provide a sanitary maintenance cart which encloses a refuse containing bag so as to deter exposure of the environment to its contents.

Yet another objective is to provide a sanitary maintenance cart having a secure and isolated compartment readily accessible to the user for personal effects.

Moreover, it is a further objective to provide a sanitary maintenance cart which conveniently and reliably maintains an inner bag liner in an open and uncollapsed condition.

A further objective is to provide an enhanced security sanitary maintenance cart which comprises relatively few component parts and which is readily and economically manufactured and assembled.

These and other objectives, which will be apparent to those skilled in the art, are achieved by a preferred embodiment which is described in detail below and illustrated in the accompanying drawings.

DESCRIPTION OF THE PREFERRED EMBODIMENT

Figure 15:
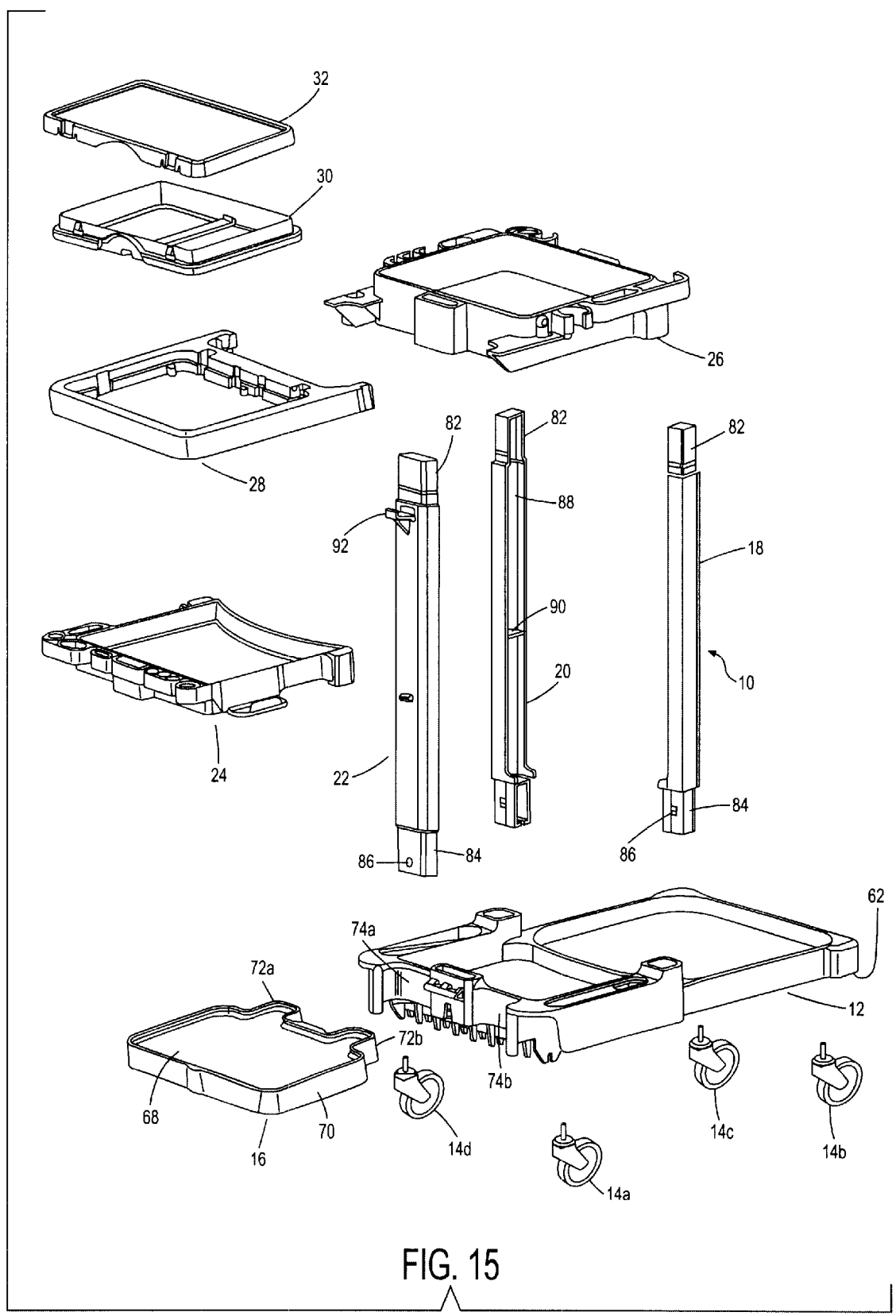
FIG. 15 is an exploded perspective view of the subject cart.

Referring to FIG. 15, the subject sanitary maintenance cart 10 is seen to comprise a rectangular support platform 12; four casters 14-A, 14-B, 14-C, and 14-D; a bag support platform 16; forward uprights 18, 20; a rearward upright 22; an intermediate shelf 24; an upper shelf 26; a handle 28; a storage compartment base 30; and a storage compartment cover 32. With the exception of the casters 14A–D, the remaining components listed above are all composed of plastic material by conventional molding process. Preferably, the components are formed of a structural foam comprising polyethylene as are components of typical prior art sanitary maintenance carts in the industry.

Figure 13:
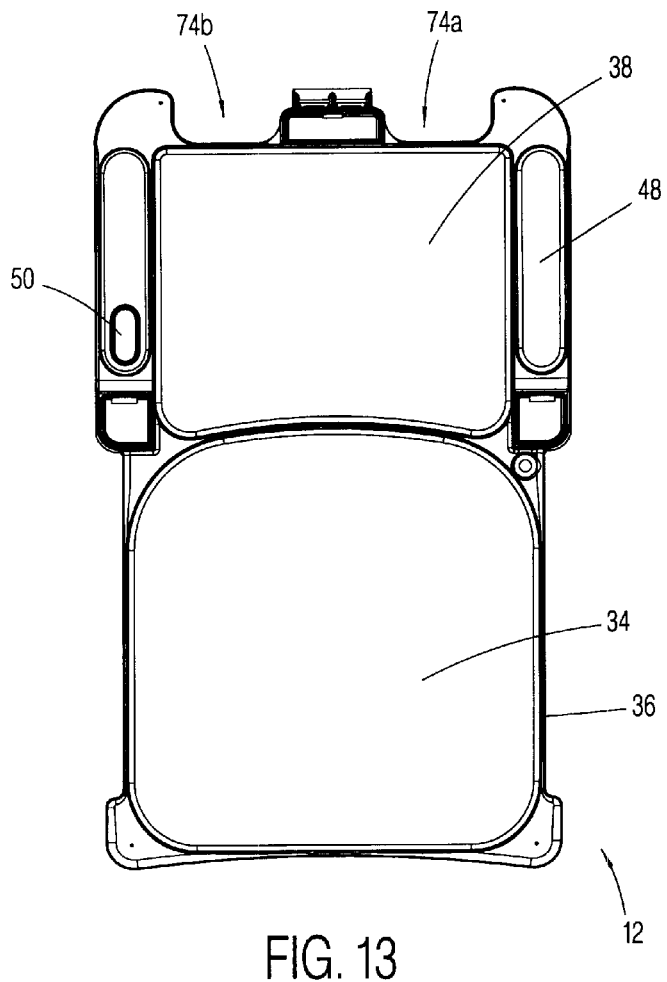
FIG. 13 is a top plan view of the base platform.
Figure 14:
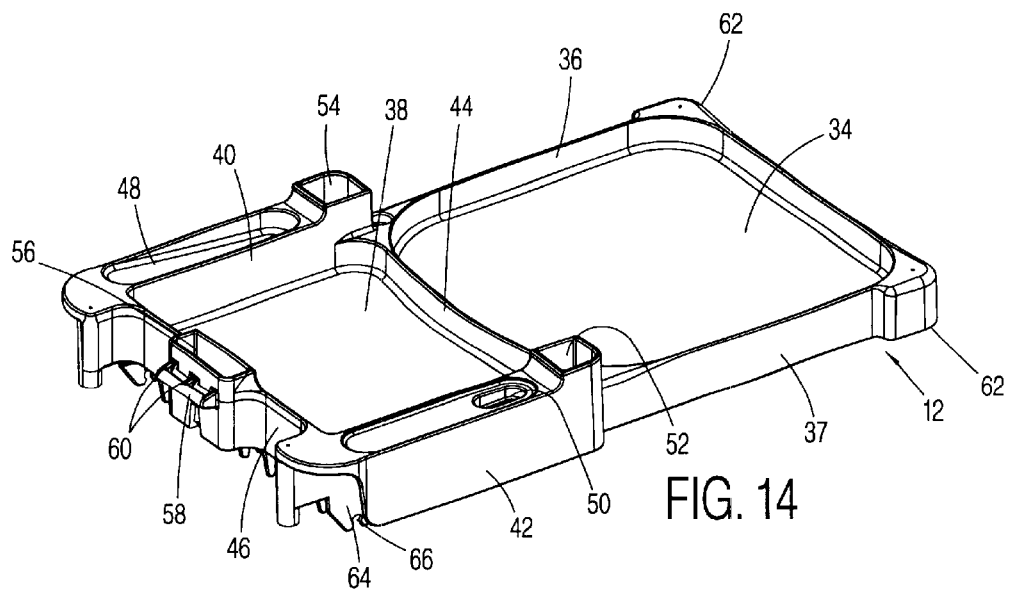
FIG. 14 is a top perspective view of the base platform.
Figure 18:
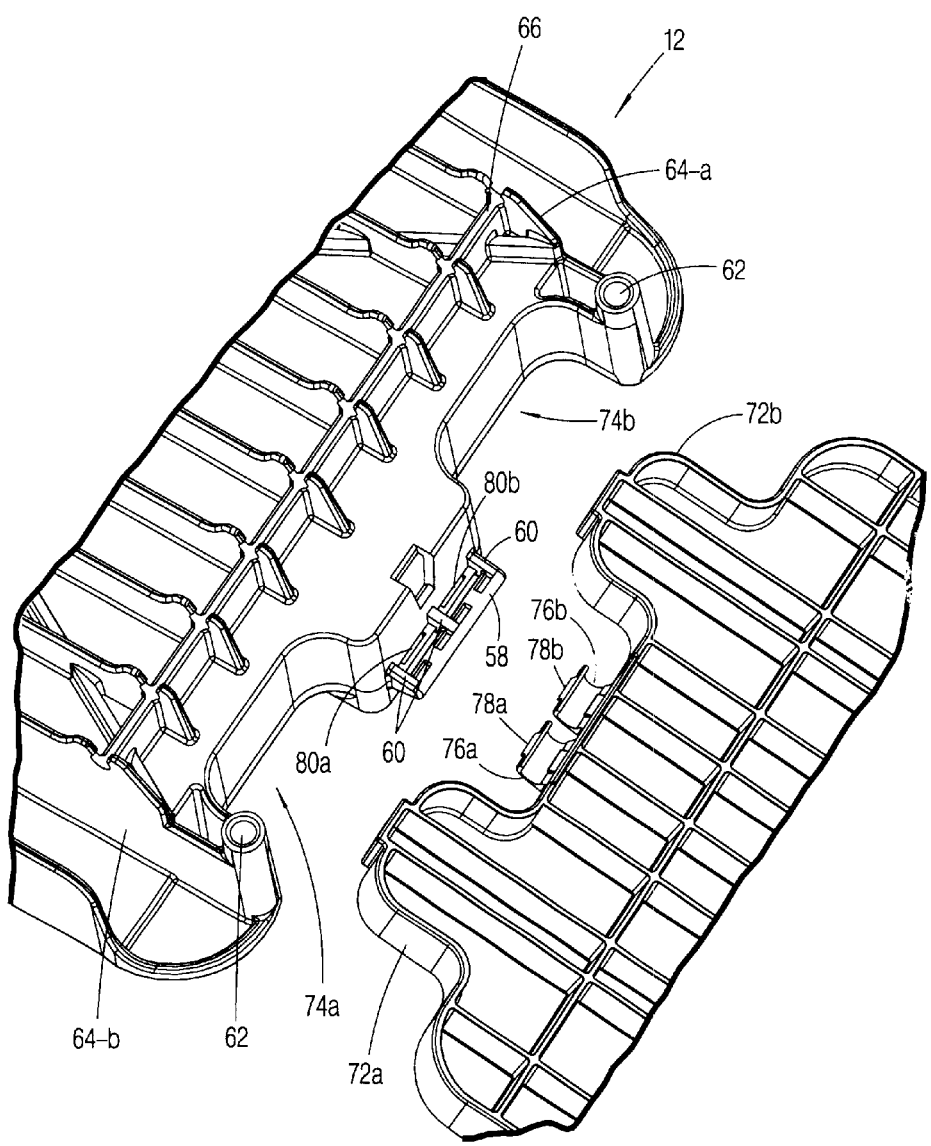
FIG. 18 is a perspective view of the support platform and bag support platform interrelationship.

As shown in FIGS. 13, 14 and 18, the support platform 12 is generally rectangular, having a forward planar top surface 34 peripherally defined by upstanding sidewalls 36, 37. A rearward planar surface 38, adjacent forward surface 34, is likewise defined peripherally by upstanding sidewalls 40, 42, a partition wall 44, and a rearward wall 46. Extending downward into the sidewall 40 from the top is a well 48 having an inclined lower surface. Disposed within the sidewall 42 is a closed bore 50.

Located adjacent the partition wall 44 are two forward sockets 52, 54 and a rearward socket 56 is positioned midway across the rearward wall 46. The sockets 52, 54 are generally square in cross section and the socket 56 is preferably rectangular in cross-section. The three sockets 52, 54, and 56 open upwardly and extend downward to interior, terminal horizontal surfaces (not shown).

A horizontal, transversely extending attachment bar 58 is integrally molded with the platform 12, positioned midway across the rearward wall 46 and connected thereto by a plurality of flanges 60 as best seen from FIGS. 15 and 18. Four caster sockets 62 are formed to extend into an underside of platform 12 at the four corners thereof. At the rearward end of platform 12, a pair of vertical flanges 64-A and 64-B are formed along opposite sides. A downward opening, U-shaped axle socket 66 is formed to extend upward into a lower edge of each flange 64-A and 64-B.

With continued reference to FIGS. 15 and 18, the bag support platform 16 provides a flat top surface 68 recessed within and peripherally rimmed by sidewalls 70. Forward projecting bosses 72A and 72B are shaped and dimensioned to interfit into corresponding recesses 74-A and 74-B of the platform 12. The platform 16 attaches to the rod 58 of platform 12 by means of forward U-shaped attachment fingers 76-A and 76-B which receive portions of the rod 58 therein. Latch tines 78-A and 78-B on the ends of fingers 76-A and 76-B project upward through openings 80-A and 80-B and engage over surfaces adjacent rod 58 to securely affix platform 16 to platform 12. To disconnect, the fingers 76-A and 76-B are flexed inward to allow tines 78-A and 78-B to escape through openings 80-A and 80-B. When attached, platform 16 projects rearward from platform 12 in cantilever fashion and surface 68 provides support from a refuse bag as will be explained further below.

The casters 14A–D are inserted into and secured within caster sockets 62 at the corners of platform 12 in conventional fashion, whereby rendering platform 12 mobile. Alternatively, an axle and wheel assembly (not shown) may be employed instead of the two rearward casters. The axle fits within the axle socket 66 in snap fit fashion and wheels are secured to opposite ends thereof in a conventional manner.

Figure 11:
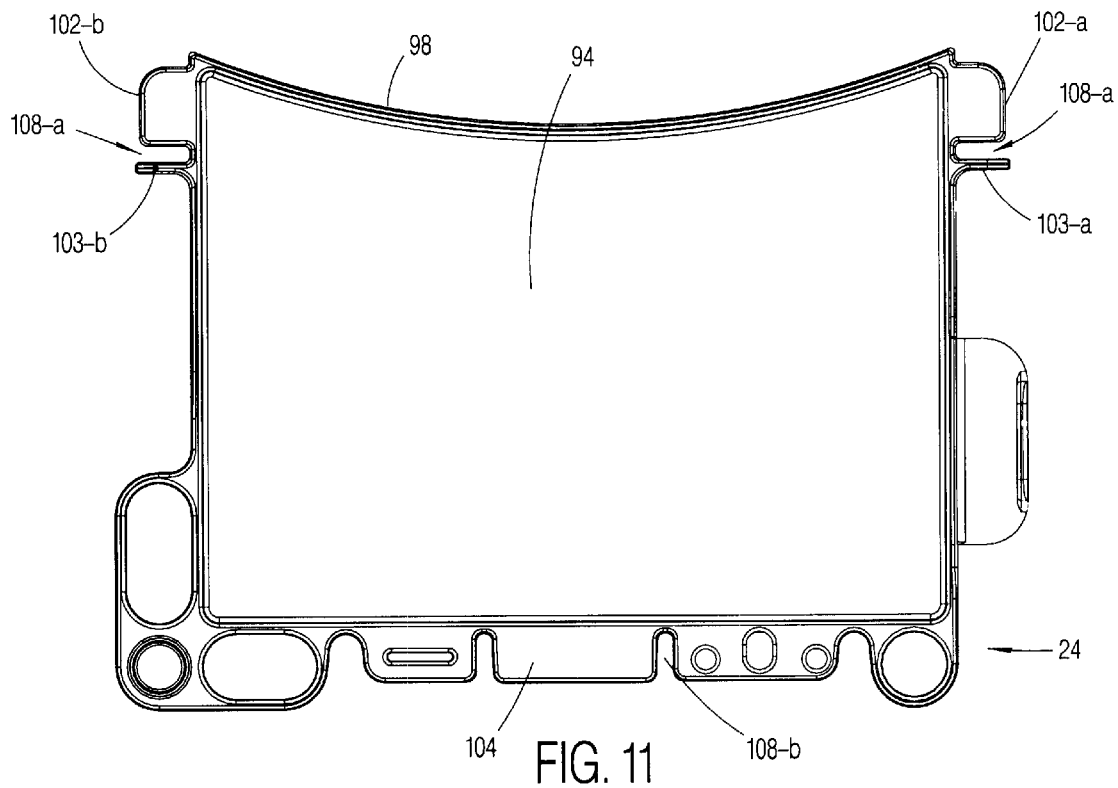
FIG. 11 is a top plan view of the lower tray.
Figure 12:
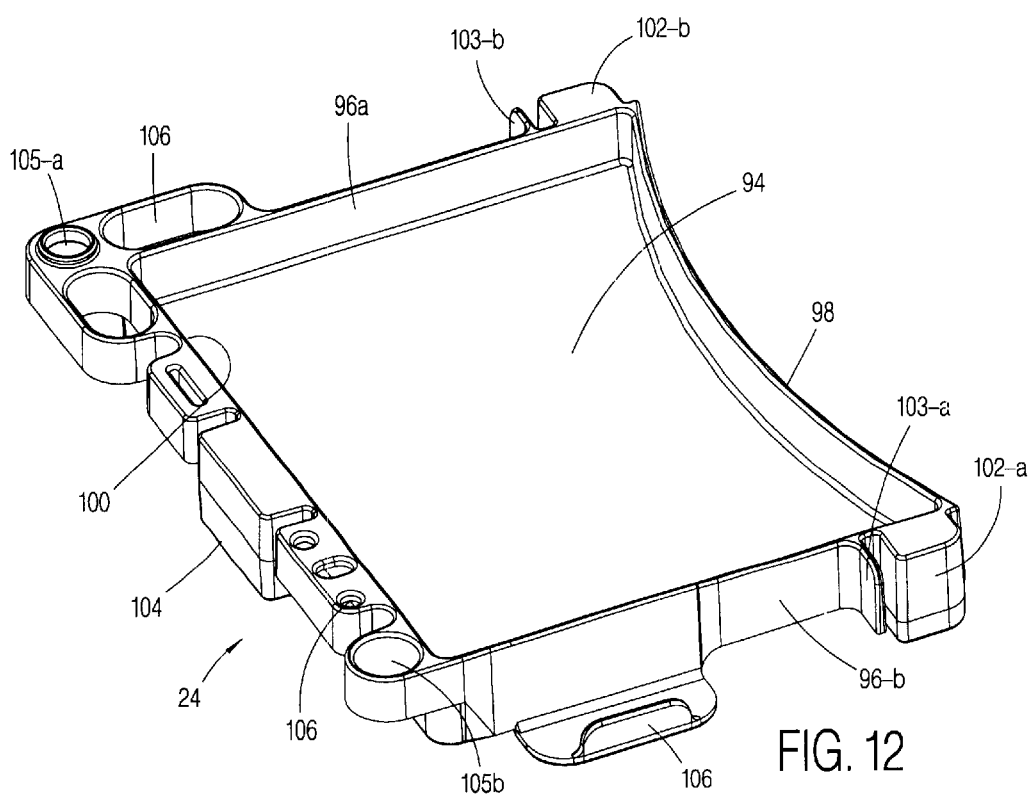
FIG. 12 is a top perspective view of the lower tray.

Referring to FIGS. 11, 12 and 15, each of the three uprights 18, 20, and 22 are configured having an inwardly stepped upper end portion 82, an inwardly stepped lower end portion 84, and a plurality of screw holes extending through the uprights, representatively depicted at 86. A longitudinal channel 88 open along one side extends the length of the uprights 18, 20, and 22 and an internal horizontal ledge 90 is provided at the midpoint of the channel 88. The rearward upright 22 is further molded to provide a hook extension 92 projecting rearward proximate the upper portion 82 thereof.

The intermediate, or lower, shelf 24 is substantially square, comprising a top horizontal surface 94 peripherally bordered by sidewalls 96-A and 96-B; an arcuate forward facing sidewall 98; and a rearward sidewall 100. First and second outward bosses 102-A and 102-B are disposed at the forward corners of the shelf 24, and first and second flanges 103-A and 103-B are disposed adjacent each boss 102-A and 102-B, respectively, separated therefrom by a space 108-A. A rearward boss 104 is defined to project outward from rearward wall 100, and a space 108-B is provided adjacent each side of boss 104. A plurality of slots and apertures 106 are formed integral with the external surfaces of sidewalls 96-A, 96-B, and 100 for the purpose of receiving and supporting various handtools and cleaning implements necessary to performance of sanitary maintenance chores.

Figure 9:
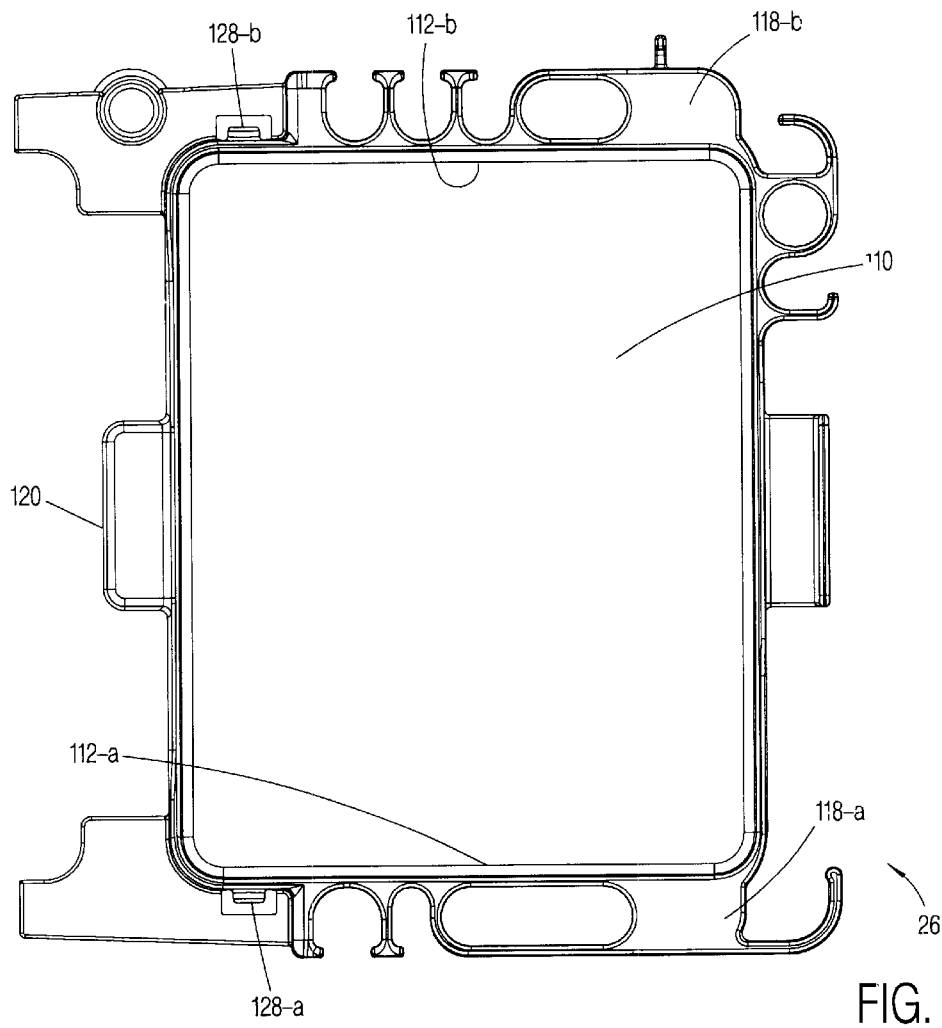
FIG. 9 is a top plan view of the upper tray.
Figure 10:
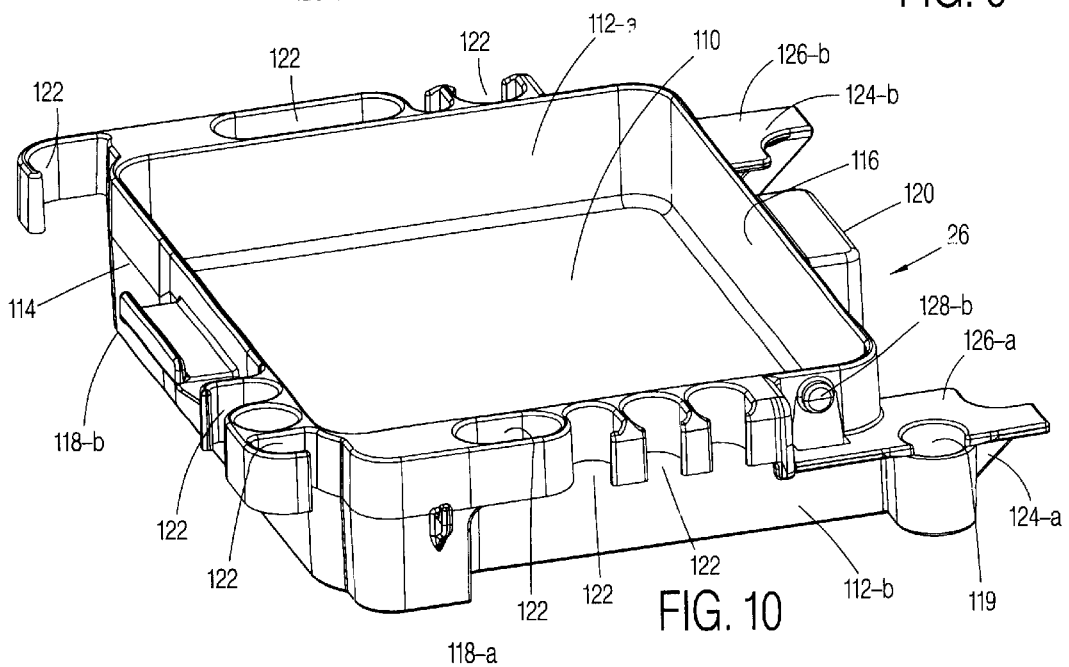
FIG. 10 is a top perspective view of the upper tray.

The upper or top shelf 26, as will be apparent from FIGS. 9, 10 and 15, comprises a top horizontal surface 110 peripherally bordered by sidewalls 112-A and 112-B; a forward facing sidewall 114; and a rearward sidewall 116. First and second outward bosses 118-A and 118-B are disposed at the forward corners of the shelf 26, and a rearward boss 120 is disposed midway across the rearward sidewall 116. A bore extends into each boss 118-A and 118-B and 120 from an underside (not shown). A plurality of slots and apertures 122 are formed integral with the external surfaces of sidewalls 112-A, 112-B, and 114 for the purpose of receiving and supporting various handtools and cleaning implements necessary for sundry sanitary maintenance chores. A pair of L-shaped arms 124-A and 124-B extend rearward from rearward corners of the shelf 26, and include a top horizontal surface 126-A and 126-B, respectively. A pivot pin 128-A and 128B extend outward from the sidewalls 112-A and 112-B, respectively proximate rearward corners of the shelf 26.

FIGS. 4, 5, 6 and 15 show the handle of the cart as comprising a substantially rectangular shaped member, having side arms 130-A and 130-B and a rear gripping portion 132. The handle 28 is substantially U-shaped in transverse section and an internal channel 131 extends along the interior of the handle 28, open to the bottom. An inward side 134 of the handle 28 is narrower than the outer side 136 of the handle 28. A key slot 138-A and 138-B extends downward into the inward side 134 of each handle side arm 130-A and 130-B, respectively. The key slots 138-A and 138-B are each formed having an undercut channel 140. A series of hooks 142 are spaced apart around the periphery of the handle 28 facing inward.

Figure 1:
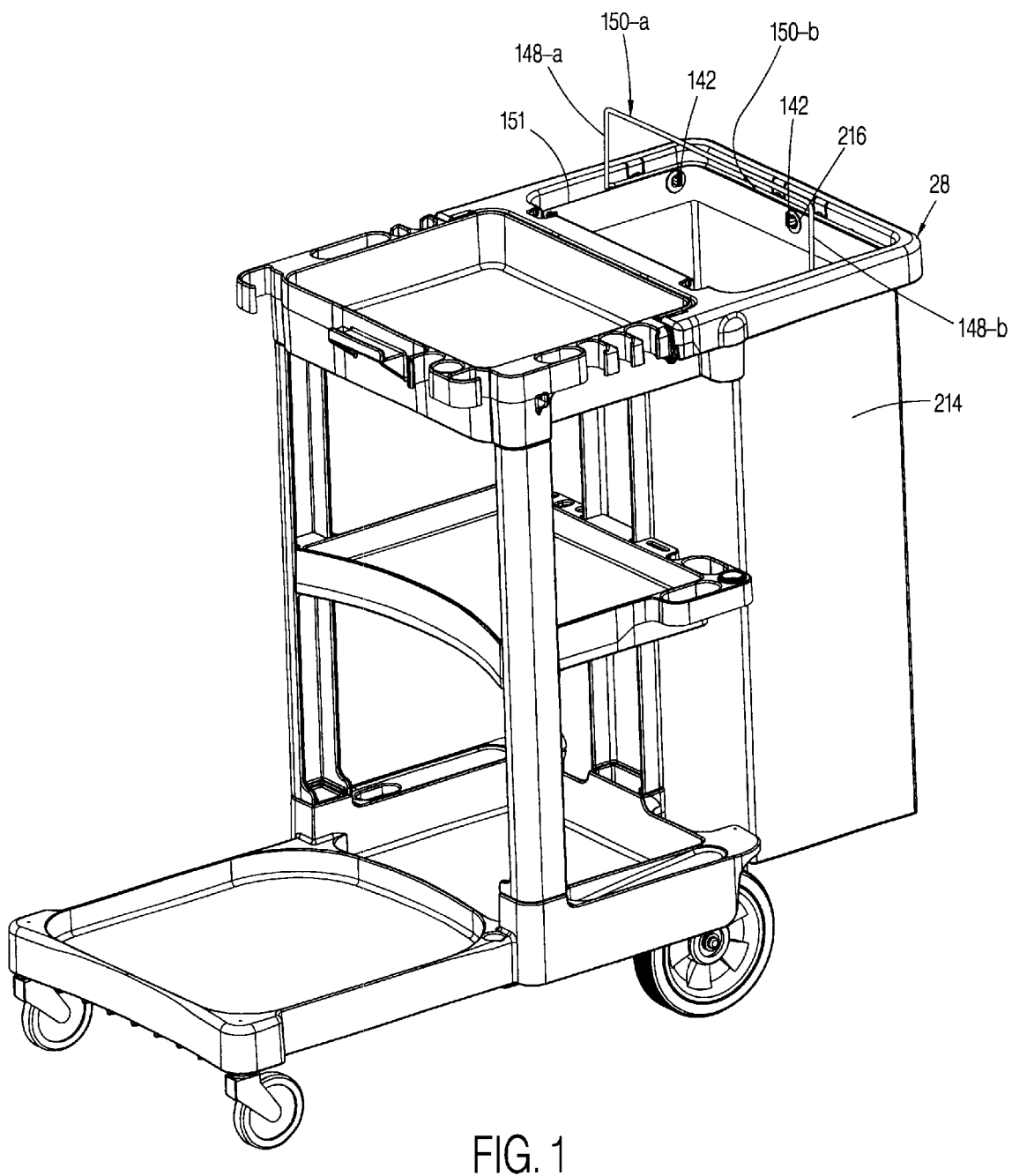
FIG. 1 is a partially assembled perspective view of the subject cart with refuse bag.
Figure 2:
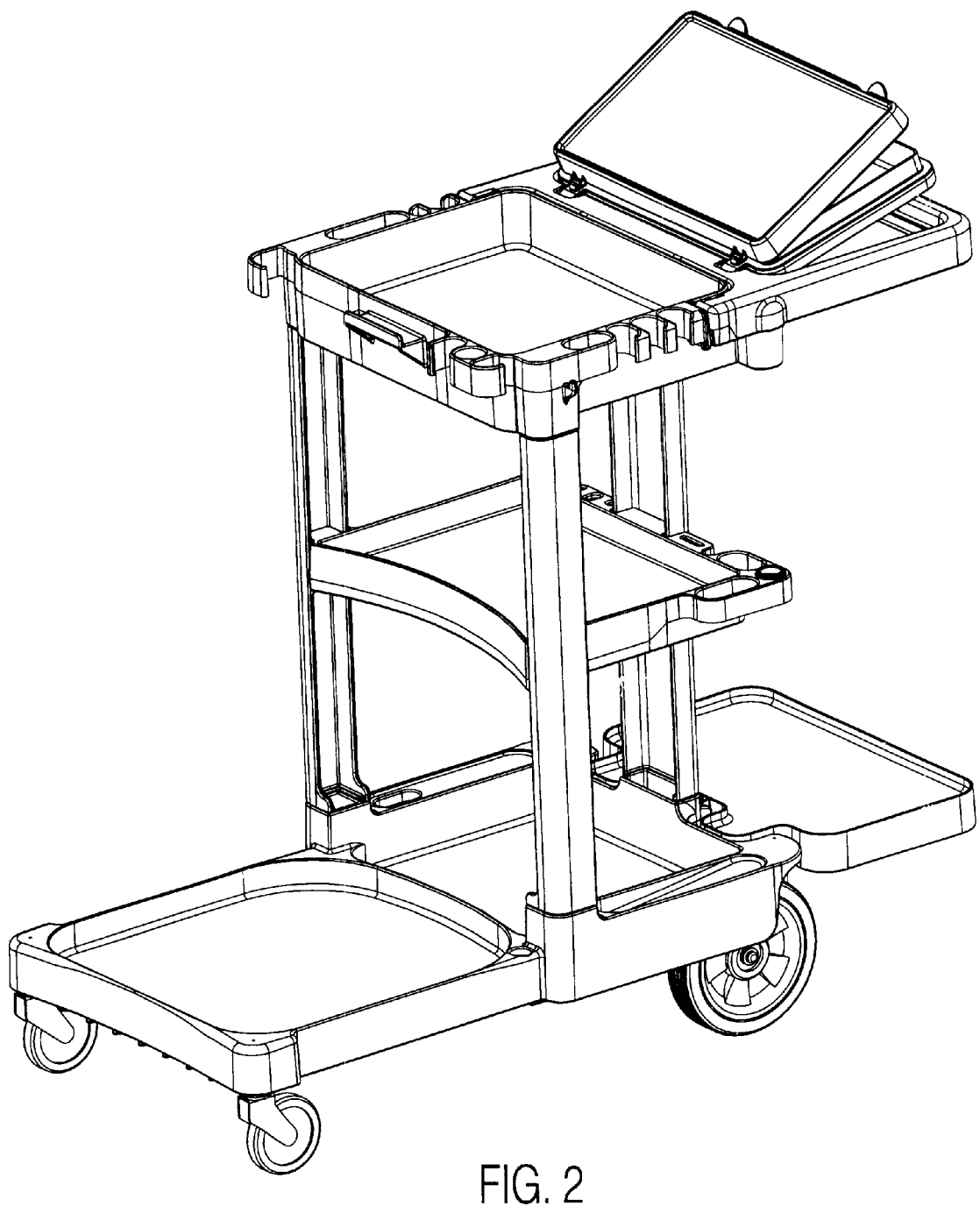
FIG. 2 is an assembled perspective view of the subject cart without refuse bag.
Figure 4:
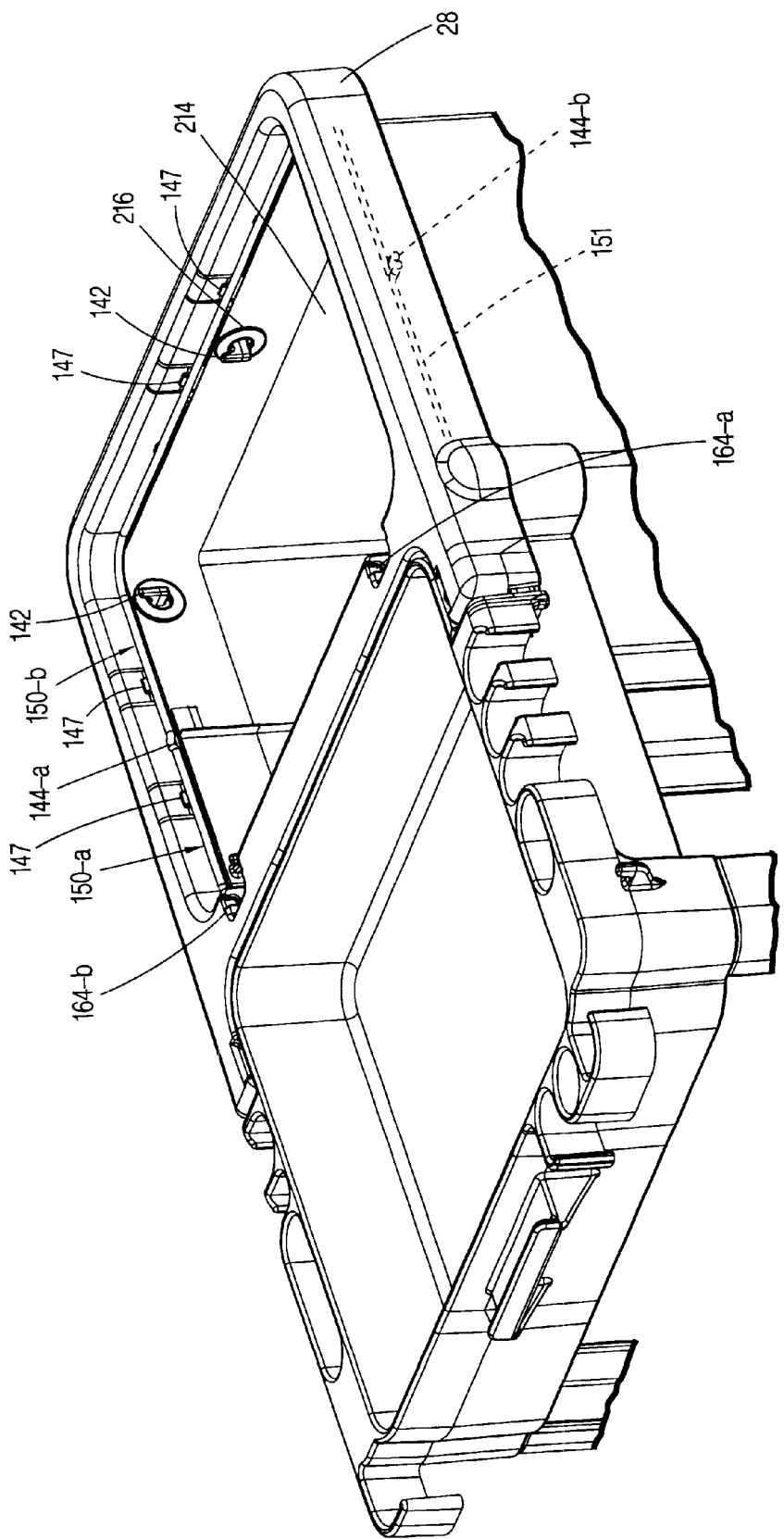
FIG. 4 is an enlarged perspective view of the upper tray and handle area of the subject cart.
Figure 6:
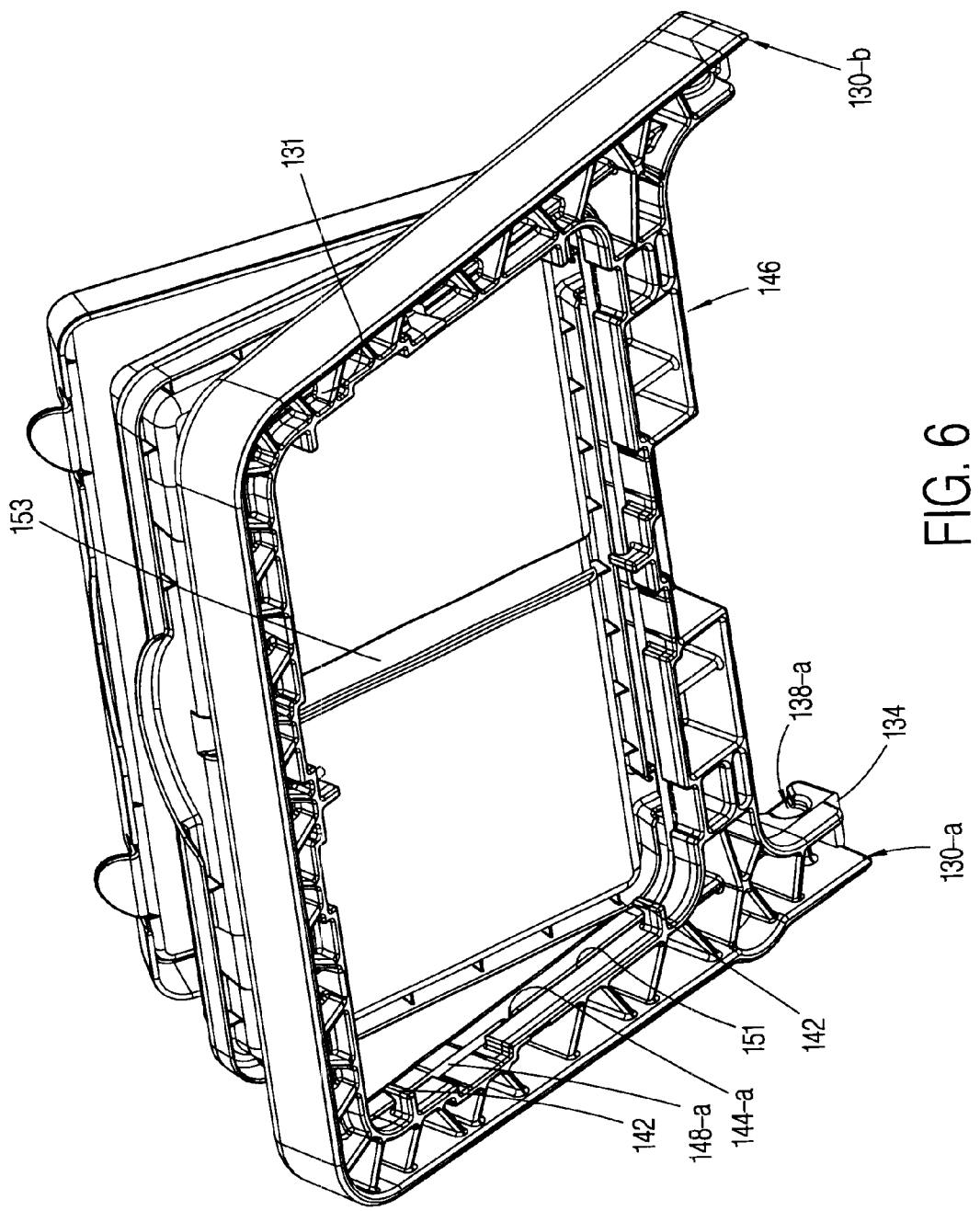
FIG. 6 is a bottom perspective view of the cover and handle assembly.

As will be appreciated from FIGS. 1, 4, and 6, an oval bar socket 144-A and an oval bar socket 144-B are formed into the side handle arms 130-A and 130-B, respectively. The sockets 144-A and 144-B are dimensioned to closely receive opposite end portions 148-A and 148-B of a pair of U-shaped steel bars 150-A and 150-B. The two steel bars 150-A and 150-B are press fit into and share the sockets 144-A and 144-B and are thereby pivotally secured therein. So mounted, each bar 150-A and 150-B is free to pivotally move between a lowered, or closed, position in which the the bars rest against a ledge 151 which peripherally extends along an inward side of the handle 28, and an upright, or open, position in which the bars 150-A and 150B are vertical as shown in FIG. 1. The ledge 151 is a horizontal surface extending about an inward facing surface of the handle 28. Protrusions 147 project outward from an inward surface of handle 28 at spaced apart intervals. The protrusions 147 are proximately located relative to the ledge 151 such that the bars 150-A and 150-B ride over the protrusions 147 as the bars reach the closed position against ledge 151. Protrusions 147 serve to retain the bars in the down, or closed, position until a user releases the bars by pulling them up and over the protrusions.

The purpose of bars 150-A and 150-B is to clamp the free ends of a plastic bag (not shown) against ledge 151, whereby suspending the bag from the handle 28 downward. The free ends of a bag are positioned against ledge 151 with the bars 150-A and 150-B upright. The bars 150-A and 150-B are thereafter pivoted downward over protrusions 147 to trap the bag ends against ledge 151. Accordingly, the free ends of the bag are clamped against ledge 151 by the bars 150-A and 150-B and are hidden within the handle 28. The bag's loose ends, resultingly, are not visible and do not make the cart appearance untidy or unsightly. The handle bars 150-A and 150-B hold the bag in an upright and open configuration, retained down by protrusions 147, and prevent an undesirable collapse of the inner liner which would make the bag inconvenient and, perhaps, dangerous to remove.

Figure 5:
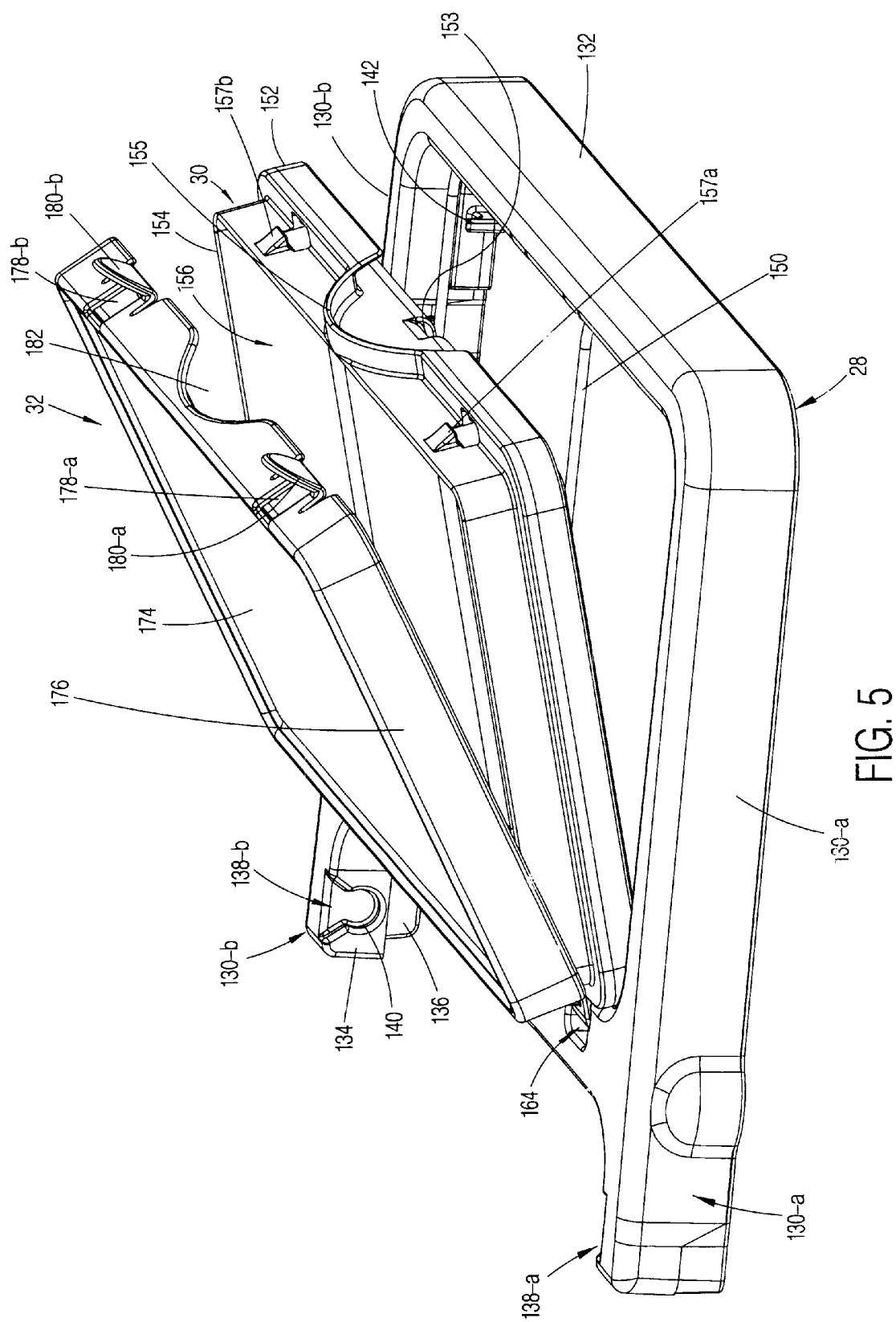
FIG. 5 is a perspective view of the cover and handle assembly.
Figure 16:
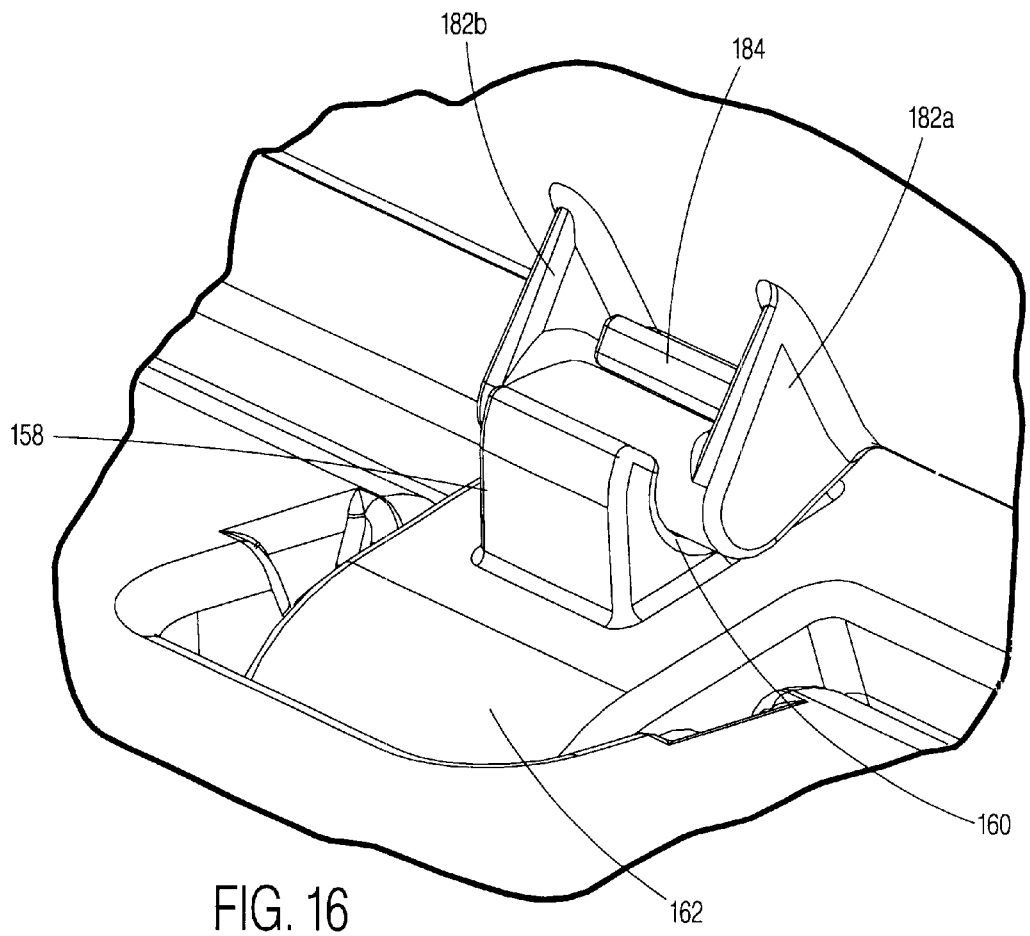
FIG. 16 is an enlarged perspective view of the hinge connection between the handle and cover.
Figure 17:
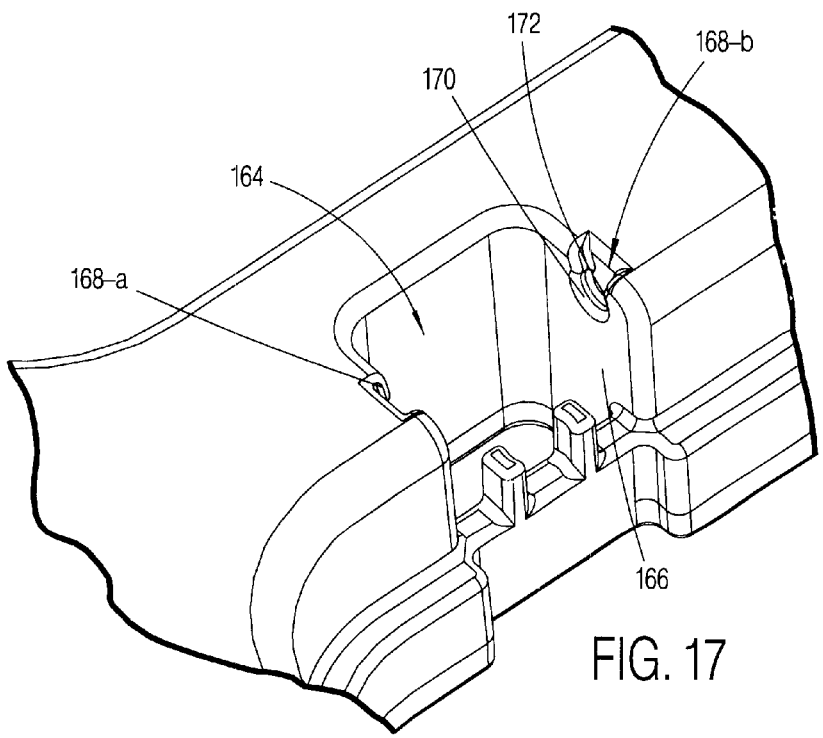
FIG. 17 is an enlarged perspective view of the hinge connection between the handle and the base.

The storage compartment base 30 is shown in FIGS. 5, 16 and 17 as comprising a base pedestal 152 having a longitudinal slot 153 extending into and bisecting a bottom surface thereof. Peripheral sidewalls 154 extend upward from the base 152 to a top rim and define therewith an internal compartment 156 for storing personal items of the use of the sanitary maintenance cart. An arcuate handle flange 155 extends from a forward sidewall 154 and first and second latch tines 157-A and 157-B are formed to depend downward from the forward sidewall 154 at an acute angle.

At the rearward end of the base 30 a pair of pivot pin supports 158 (one of which shown in FIG. 16) are formed in spaced apart relationship to extend upward from a top surface of first and second attachment arms 162 (one shown in FIG. 16). The pivot pin supports 158 each have an upwardly open transverse pivot pin socket 160. The arms 162 are substantially C-shaped and have end portions dimensioned for close receipt within correspondingly located attachment wells 164-A and 164-B (FIGS. 4 and 17) in the handle 28 top surface. The wells 164-A and 164-B are formed to have sidewalls 166 and key slots 168-A and 168-B formed therein. As shown, the slots 168-A and 168-B are shaped having a circular lower portion 170 and under cut 172 circumscribes each portion 170. The C-shaped arms 162 have outward extending buttons (not shown) at opposite sides which enter into the slots 168-A and 168-B in conventional manner, trapped within the under cut 172 thereof.

So attached, the base 30 is pivotally connected to the handle 28 and moves between a horizontal position in which the center opening of handle 28 is covered and an over-center, vertical second position in which the center opening of handle 28 is exposed. In the over-center position, the base 30 remains until manually pivoted forward and downward to cover the handle opening. In the horizontal configuration, the base 30 is securely positioned within the confines of the handle 28 upon bars 150-A and 150-B. To release the base 30, an upward force is applied to force the base 30, whereby freeing the base to pivot upward into the over-center second position. The handle 155 is used for applying the requisite force.

Figure 7:
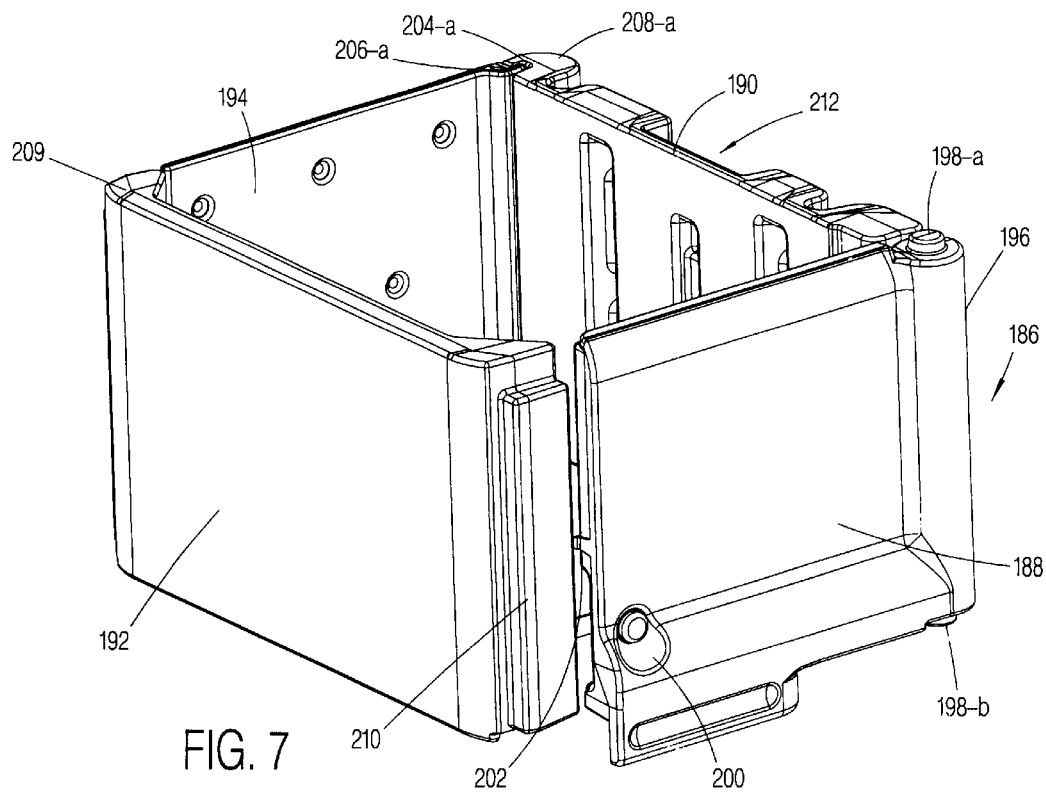
FIG. 7 is a perspective view of the lockable storage enclosure.
Figure 8:
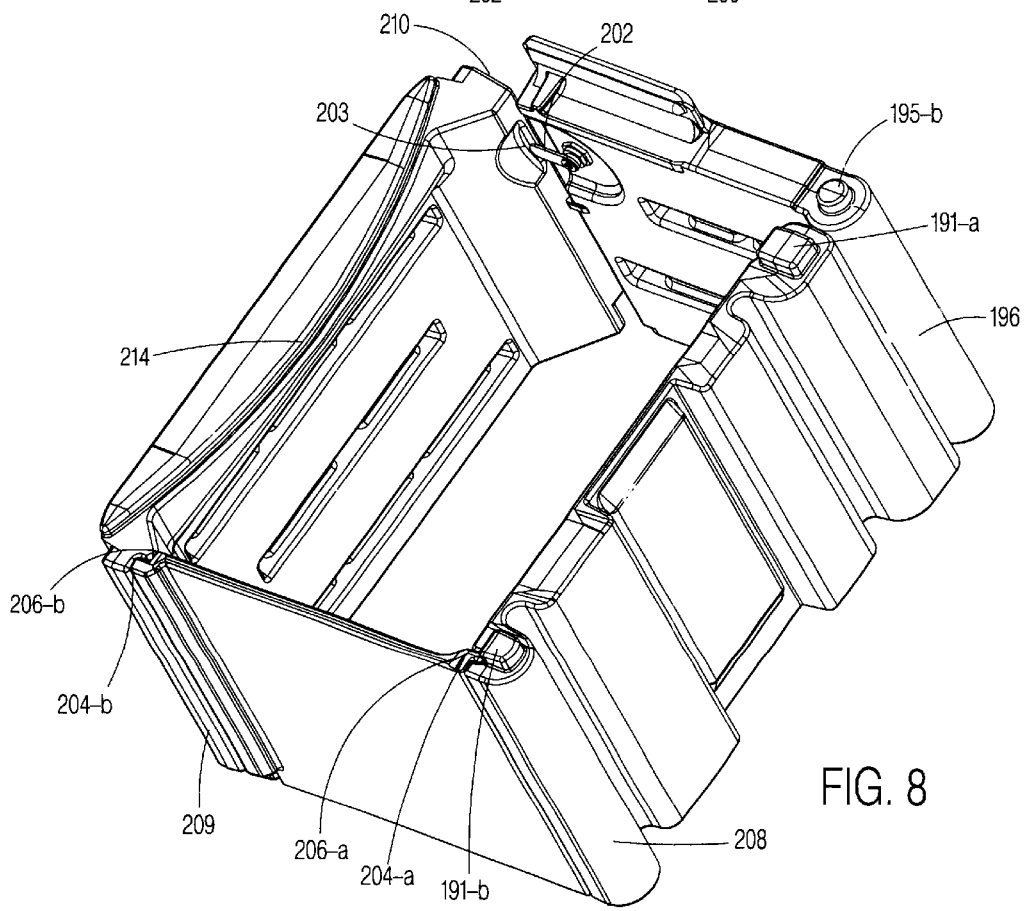
FIG. 8 is a bottom perspective view of the storage enclosure.

With reference to FIGS. 7 and 8, an enclosure 186 is provided as an accessory to the subject cart 10, and comprises a door panel 188; a first sidewall panel 190; a second sidewall panel 192; and a rear panel 194. The sidewall panel 190 is connected along a forward edge to the door panel 188 by a pivot hinge connection 196. Top and bottom posts 198-A and 198-B project from the hinge 196. The door panel 188 further has a depressible, key activated, spring biased access button 200 which pivotally activates a locking finger 202 on the opposite side of panel 188. The locking finger moves in and out of a depression 203 positioned within a forward edge of the panel 192. Protrusions 191-A and 191-B project downward from the corners of panel 190.

The panels 190 and 192 have elongate slots 204-A and 204-B, respectively, along an inward surface proximate a rearward edge. The slots 204-A and 204-B are dimensioned to closely receive opposite edge portions 206-A and 206-B of the rear panel 194, respectively. A cornice protrusion 208 projects outward from panel 190 and a cornice protrusion 209 projects outward from panel 192 along a rearward edge. A forward projecting rectangular protrusion 210 extends from the forward edge of panel 192. Depression 203 is formed within the protrusion 210.

Assembly of the subject cart proceeds as follows. With reference to FIGS. 13, 14 and 15, the lower ends 84 of the uprights 18, 20, and 22 are sized and dimensioned for close receipt within the sockets 52, 54, and 56, respectively, of the support platform 12. Thereafter, appropriate screws and nuts (not shown) are used for insertion through the platform 12 and apertures 86 to firmly attach the uprights into vertical position. The casters 14A–D attach into the bottom sockets 62 of the platform 12, whereby facilitating movement of the cart along a floor surface.

As shown in FIGS. 15 and 18, the bag support platform 16 attaches to the rear of platform 12 by means of hooks 76-A and 76-B which snap into openings 80-A and 80-B of pin 58. Resultingly, the platform 16 projects rearward in cantilever fashion and is suspended from the platform 12.

The middle shelf 24 attaches to the uprights 18, 20, and 22 midway up the length thereof. As will be appreciated from FIGS. 11, 12, and 15, the bosses 102-A and 102-B of shelf 24 are positioned within the channel 88 of uprights 18, 20, and brought to rest upon ledge 90 therein. The sides of uprights 18, 20 reside within spaces 108-A and 108-B and adjacent flanges 103-A and 103-B. Thereafter, suitable screws and nuts (not shown) are employed to secure the connection therebetween. The boss 104 of shelf 24 is likewise inserted into the upright 22, situated upon an internal ledge (not shown) therein, and fastened into place by suitable hardware.

It will be appreciated that the arcuate forward surface 98 of shelf 24 is offset to the rear relative to the radiussed partition wall 44 of the support platform 12 therebelow. This offset compensates for the outward draft from bottom to top in standard plastic refuse cans. The subject cart is intended to accept a refuse container upon surface 34 of platform 12, and the surface 98 accepts an upper portion of the container therein. The surface 98 braces the refuse container and prevents lateral movement of the container in either side direction. The support and restraint afforded by surface 98 acts to prevent tippage of the container when the cart is turned. The radiussed curvature of surface 98 complements the curvature of cylindrical waste receptacles of a type common in the industry.

The upper shelf 26, as depicted in FIGS. 9, 10 and 15 attaches to the upper ends of 82 of uprights 18, 20, and 22. Portions 82 project upward into underside sockets (not shown) which extend into bosses 118-A and 118-B, and into median shoulder 120. Thereafter, assembly hardware, preferably nuts and bolts (not shown) are extended through adjacent portions 82 and shelf 26 to secure the attachment. The upper shelf 26 is thus fixedly attached to the upper ends 82 of the uprights, spaced above the middle shelf 24. Space is accordingly made on shelf 24 to accommodate the storage of bottles, cleaning implements, etc. thereon. The peripheral slots and sockets 122 formed along external surfaces of shelf 26 align with corresponding slots and sockets 106 of the middle shelf to accommodate receipt of various brushes and long handled implements necessary in the performance of sanitary maintenance duties.

The enclosure 186 shown in FIGS. 7 and 8 is intended to provide an optional secure storage compartment for the user for use in conjunction with shelf 24 and shelf 26. The enclosure 186 is, at the option of the user, positioned upon shelf 24 after assembly of shelf 24 to the uprights 18, 20, and 22. The protrusion 210 fits within channel 88 of upright 20; cornice protrusion 209 fits closely within channel 88 of upright 18; and upright 22 fits within channel 212 in sidepanel 190. The bottom post 198-B of the door underside fits within socket 105-A of shelf 24; and protrusion 191-B fits within socket 105-B. The lower portion 214 of panel 192 is arcuate to complement the curvature of the sidewall 98 of shelf 24.

The top shelf 26 is then attached to the top of the uprights in the manner described previously. The top post 198-A is received within shelf socket 119. The top shelf 26 thereby entraps the enclosure 186 against the middle shelf 24 with the door panel 188 opening to a side of the cart. The enclosure 186 represents the means for securing the content of shelf 24 from access by unauthorized individuals and enhances the security of the cart.

The handle 28 attaches to the upper shelf 26 in conventional fashion as the handle side arms 130-A and 130-B are positioned over the top surfaces 126-A and 126-B of the shelf 26. As seen from FIGS. 4, 5, 9 and 10, the handle key slots 138-A and 138-B receive respectively the pivot pins 128-A and 128-B of the shelf 26, which are entrapped into the under cut channels 140 of the key slots. The handle arms 130-A and 130-B are thus pivotally connected to shelf 26 and pivot between an upper position in which the handle is substantially vertical, for storage space conservation, and a downward position in which the handle is substantially horizontal and rests upon surfaces 126-A and 126B.

An outer bag 214, preferably composed of semi-rigid vinyl, as shown in FIGS. 1 and 4, attaches to the handle 28. Peripherally located grommets 216 of the bag attach over the hooks 142 surrounding the central opening of the handle 28 and the bag is suspended therefrom. The length of the bag 214 is such that it rests upon the bag supporting platform 16 (FIG. 15) and is supported thereby. A user of the cart typically uses an inner plastic refuse bag inside of outer bag 214. The subject invention provides means for attaching such inner bag to the handle 28 by bars 150-A and 150-B in the manner described previously, such that the inner bag is suspended in the outer bag 214. Upper end portions of the inner bag are clamped to the handle 28 in an open condition for ready access. A user casts refuse and other contaminated material into the inner liner of bag 214 in the performance of maintenance duties. The inner bag, open at the top, is in contact with the surrounding air and airborn contamination can sometimes escape.

Figure 3:
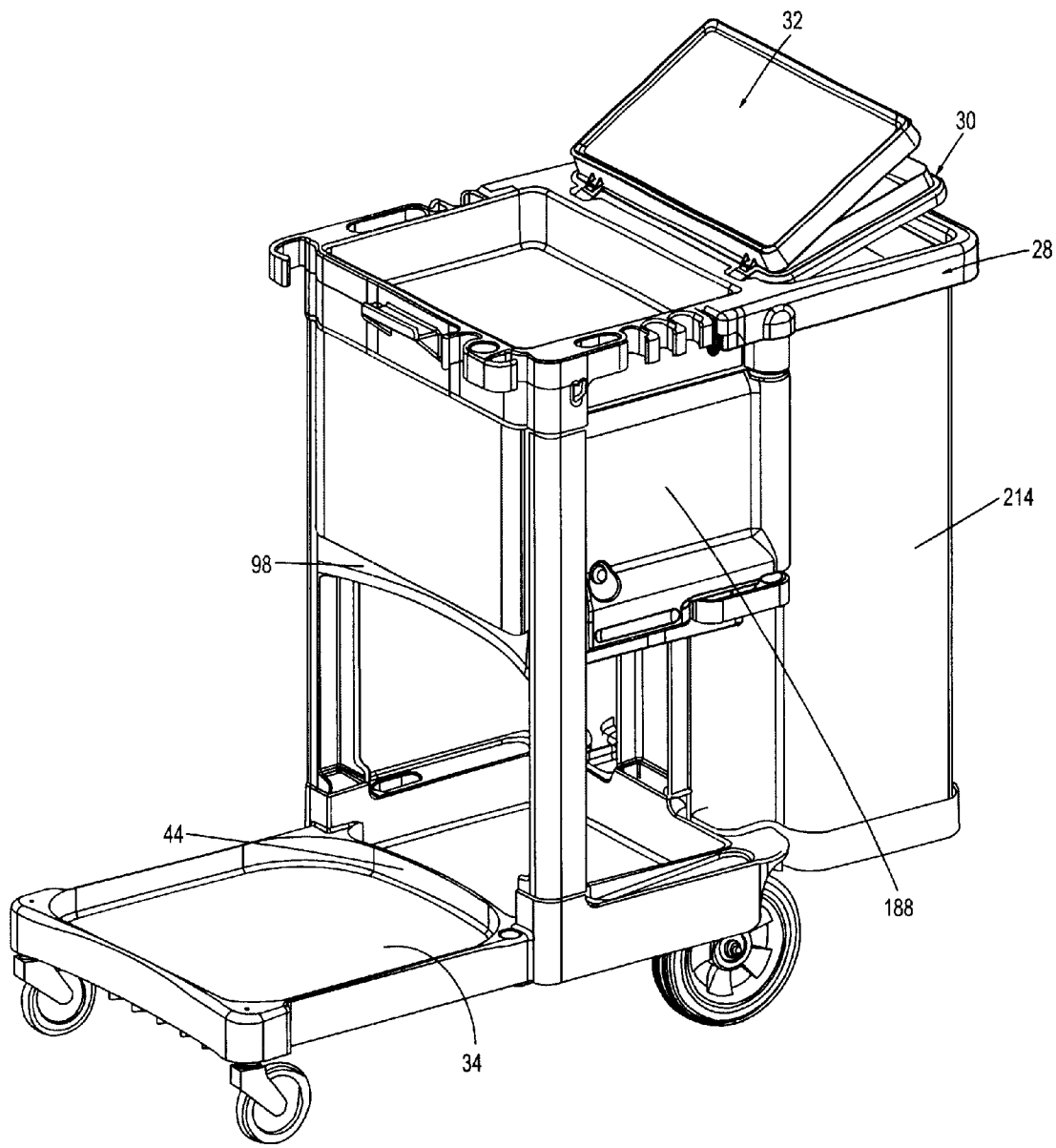
FIG. 3 is a fully assembled perspective view thereof with refuse bag.

The storage compartment base 30 attaches to the handle 28 in the manner described previously and pivots reciprocally upward and downward as depicted in FIGS. 3 and 6. In the horizontal, or "down" position, the handle 28 receives the base 30 and the base 30 is securedly received within the confines of the handle 28, resting upon bars 150-A and 150-B in their "down" position. So positioned, the base 30 covers the inner bag liner within bag 214 and prevents environmental exposure to the content of the bag. To access the bag, the user pressures the handle 155 upward until the base 30 moves upward to its over-center position. In the uppermost position, the base 30 is over the pivot axis represented by the pivotal connection between arms 162 and handle wells 164, and stays in that position until moved downward by the user.

The storage compartment cover 32 is pivotally attached to the base 30 as shown in FIG. 16 and pivots vertically relative thereto between and open and closed position. In the closed, or "down" position, the spring flanges 178-A and 178-B snap over the tines 157-A and 157-B of the base to lock the cover to the base. To release, the thumb flanges 180-A and 180-B are pressured backward, moving flanges 178-A and 178-B forward until they escape tines 157.

From the foregoing, it will be appreciated that the subject cart provided enhanced security in several significant respects. First, the well or recess presented by the middle shelf arcuate sidewall 98 cradles the refuse container carried by surface 34 and prevents lateral tipping. The curvature of the partition wall 44 complements the curvature of the shelf sidewall 98 to stabilize the receptacle at the bottom (by partition wall 44) and at the top (by the shelf sidewall 98).

Moreover, the storage compartment cover 32 and base 30 provide a secure compartment for the user to place keys and other personal items which would otherwise be visible and, hence, vulnerable to people passing the cart. The storage compartment represented by cover 32 and base 30 thus allows for storage of valuable items and minimizes the potential for their from theft.

In addition, the storage compartment represented by cover 32 and base 30 operates to cover the bag 214 in the "down" position, and is secured within the handle 28 in the down position. This position serves to isolate the contents of the bag and prevents undesirable exposure of the user and the surrounding environment to the contents of the bag. Since such contents can include medical refuse, or poisons, or other material of a harmful nature, isolating the bag contents by storage compartment 30, 32 is a significant consolation to the user.

Finally, the clamping system in the cart handle provides a secure means for holding the inner bag in an open, uncollapsed condition. The top of the inner bag is shielded by the handle and, therefore, is not unsightly. Clamping the inner liner in an open condition provides for its convenient and safe removal from the outer liner 214 by the user.

While the above describes a preferred embodiment of the subject invention, the invention is not intended to be so limited. Other embodiments which will be apparent to those skilled in the art and which utilize the teachings herein set forth, are intended to be within the scope and spirit of the invention.

What is claimed is:

1. A mobile cart comprising:

a wheeled platform;

at least one support upright extending upward from the wheeled platform;

an upper shelf mounted to an upper end of the at least one support upright;

a handle extending rearward from the upper shelf, the handle defining a central opening; and a cover having an internal storage compartment provided within the cover, wherein the cover is mounted to pivot between a closed position in which the cover encloses the handle central opening and an open position in which the central opening is exposed.

2. A mobile cart according to claim 1, wherein the internal storage compartment of the cover has a compartment base which has a bottom floor and sidewalls extending from the bottom floor and defining therewith an upwardly open storage compartment; and wherein the cover has a cover panel pivotally mounted to the compartment base and pivoting between a closed position wherein the cover panel encloses the internal storage compartment and an open position in which the internal storage compartment is upwardly exposed.

3. A mobile cart according to claim 2, wherein the cover pivots over a pivot axis and is retained in a stationary condition in the open position.

4. A mobile cart according to claim 3, wherein the cover panel and compartment base have mutually engaging fasteners for releasably securing the cover panel to the compartment base in the closed position.

5. A mobile cart according to claim 1, wherein the cover is received within the handle central opening in the closed position.

6. A mobile cart according to claim 1, further comprising:

at least one retention member connected to the handle between the handle and the central opening for maintaining and supporting an upper end of a refuse bag in an open condition.

7. A mobile cart according to claim 6, wherein the retention member comprises a clamping bar pivotally mounted to the handle and pivoting between between a closed position against a clamping surface and an open postion away from the clamping surface.

8. A mobile cart according to claim 7, wherein the clamping surface comprises a ledge extending along an inward facing side of the handle.

9. A mobile cart according to claim 7, wherein the clamping surface peripherally surrounds the handle central opening.

10. A mobile cart according to claim 8, wherein the clamping bar is shaped and dimensioned to reside upon at least a portion of the ledge.

11. A mobile cart according to claim 1, further comprising at least one intermediary shelf positioned below the upper shelf and attached to the support upright, and a four-sided enclosure mounted on the intermediary shelf and defining with the intermediary shelf and the upper shelf an interior storage chamber, and at least one side of the enclosure comprises a door panel moving between a closed position wherein the interior storage chamber is inaccessible to a user and an open position wherein the interior storage chamber is accessible to the user.

12. A mobile cart according to claim 11, wherein the door panel is pivotally attached to the enclosure and pivots between the closed and the open positions.

13. A mobile cart according to claim 1, further comprising:

a container registration member disposed above the wheeled platform and having a forward-facing recess, wherein the wheeled platform includes a forward surface portion dimensioned to support a container that defines an external geometric profile, wherein the forward-facing recess of the container registration member is positioned to receive an upper portion of a container supported by the forward surface portion, and wherein the forward-facing recess is dimensioned and shaped to complement the external geometric profile of a container supported by the forward surface portion.

14. A mobile cart according to claim 13, wherein the container registration member comprises the intermediary shelf.

15. A mobile cart according to claim 14, wherein the recess is defined by a forward facing side of the intermediary shelf.

16. A mobile cart according to claim 15, wherein the wheeled platform top support surface has a rearward surface portion dimensioned to support a bag suspended from the mobile cart handle.

17. A mobile cart comprising:

a wheeled platform;

at least one support upright extending upward from the wheeled platform;

a handle extending rearward from the at least one support upright, the handle defining a central opening that defines a handle inner perimeter, wherein a clamping ledge extends along substantially all of the inner perimeter;

at least one clamping bar pivotally mounted to the handle and pivoting between a closed position against substantially all of the clamping ledge and an open position away from the clamping ledge; and a cover pivotally mounted to the handle, the cover pivoting between a closed position wherein the cover encloses the handle central opening and an open position wherein the central opening is exposed, wherein the cover is received within the handle central opening in the closed position and is supported by the clamping bar, and wherein the cover has an internal storage compartment.

18. A mobile cart according to claim 17, wherein the cover has a base member which has sidewalls defining the internal storage compartment and a lid member engaging the base member and enclosing the storage compartment.

19. A mobile cart comprising:

a wheeled platform;

at least one support upright extending upward from the wheeled platform;

a handle extending rearward from the at least one support upright, the handle defining a central opening that defines a handle inner perimeter, wherein a clamping ledge extends along substantially all of the inner perimeter; and at least one clamping bar pivotally mounted to the handle and pivoting between a closed position against substantially all of the clamping ledge and an open position away from the clamping ledge, wherein the at least one clamping bar is two U-shaped clamping bars each having two side portions connected by a bottom portion.

20. A mobile cart according to claim 19, wherein the two U-shaped clamping bars are pivotally mounted adjacent one another, wherein when the two bars are in the open position, the bottom portions of the two U-shaped bars are in a substantially side-by-side arrangement, and wherein when the two U-shaped bars are in the closed position, the two U-shaped bars lie in the same plane with their bottom portions away from each other.

* * * * *